(12) United States Patent
Lee et al.

(10) Patent No.: US 9,305,592 B1
(45) Date of Patent: Apr. 5, 2016

(54) RECEPTION TERMINAL AND A METHOD FOR COMPENSATING INTER-SYMBOL INTERFERENCE AND COMPUTER READABLE RECORDING MEDIUM FOR PERFORMING THE SAME

(71) Applicant: Foundation of Soongsil University-Industry Cooperation, Seoul (KR)

(72) Inventors: Jaejin Lee, Seoul (KR); Seongkwon Jeong, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 14/583,014

(22) Filed: Dec. 24, 2014

(30) Foreign Application Priority Data

Oct. 21, 2014 (KR) .................... 10-2014-0142921

(51) Int. Cl.
*G11B 7/00* (2006.01)
*G11B 20/10* (2006.01)
*G11B 7/0065* (2006.01)
*G11B 7/08* (2006.01)
*G11B 7/007* (2006.01)

(52) U.S. Cl.
CPC ........ *G11B 20/10212* (2013.01); *G11B 7/0065* (2013.01); *G11B 7/00781* (2013.01); *G11B 7/083* (2013.01)

(58) Field of Classification Search
None
See application file for complete search history.

(56) References Cited

U.S. PATENT DOCUMENTS

| | | | |
|---|---|---|---|
| 5,694,488 A * | 12/1997 | Hartmann | 382/210 |
| 6,697,316 B2 * | 2/2004 | Burr | 369/103 |
| 7,315,575 B2 * | 1/2008 | Sun | H04B 10/6162 375/229 |
| 2003/0218955 A1 * | 11/2003 | Isshiki | G11B 7/24088 369/59.21 |
| 2004/0184381 A1 * | 9/2004 | Coene | 369/59.24 |
| 2005/0147020 A1 * | 7/2005 | Van Someren et al. | 369/275.4 |
| 2005/0265450 A1 * | 12/2005 | Raveendran et al. | 375/240.15 |
| 2005/0286096 A1 * | 12/2005 | Yoon | 358/483 |
| 2007/0025222 A1 * | 2/2007 | Immink et al. | 369/59.2 |
| 2007/0085709 A1 * | 4/2007 | Coene et al. | 341/50 |
| 2008/0008061 A1 * | 1/2008 | Bruls et al. | 369/44.32 |
| 2008/0239898 A1 * | 10/2008 | Van Der Lee et al. | 369/47.53 |

(Continued)

FOREIGN PATENT DOCUMENTS

JP 2009-140606 A 6/2009
KR 10-2005-0091541 A 9/2005

(Continued)

*Primary Examiner* — Tan X Dinh
(74) *Attorney, Agent, or Firm* — Novick, Kim & Lee, PLLC; Sang Ho Lee

(57) ABSTRACT

A reception terminal and a method for compensating for inter-symbol interference (ISI) in a two-dimensional (2D) data structure are provided. The method for compensating for ISI includes transmitting, from a transmission terminal, a plurality of source pixel values based on a source 2D data structure via a channel, receiving, at a reception terminal, a plurality of pixel values for compensation based on a 2D data structure, and compensating each of the plurality of pixel values for compensation to each of corresponding pixel values after compensation. The plurality of pixel values for compensation are changed values of the pixel values of the source pixels due to the ISI, and each of the pixel values after compensation is determined based on both of each of the pixel values for compensation and values of adjacent pixels thereof.

4 Claims, 7 Drawing Sheets

(56) References Cited

U.S. PATENT DOCUMENTS

2010/0103487 A1 4/2010 Erdei et al.
2015/0269405 A1* 9/2015 Huetter ............... G06K 7/1417
                                                         235/462.1

FOREIGN PATENT DOCUMENTS

| KR | 10-2005-0122375 A | 12/2005 |
| KR | 10-2009-0109099 A | 10/2009 |

* cited by examiner

RECEPTION TERMINAL AND A METHOD FOR COMPENSATING INTER-SYMBOL INTERFERENCE AND COMPUTER READABLE RECORDING MEDIUM FOR PERFORMING THE SAME

CROSS-REFERENCE TO RELATED APPLICATION

This application claims priority to and the benefit of Korean Patent Application No. 10-2014-0142921, filed on Oct. 21, 2014, the disclosure of which is incorporated herein by reference in its entirety.

BACKGROUND

The present disclosure relates to a method and apparatus for compensating for inter-symbol interference in a two-dimensional (2D) data structure, and more particularly, to a method and apparatus for compensating for inter-symbol interference that occurs after a 2D data structure passes through a channel.

A patterned media recording device is a high-capacity storage device, and therefore receives attention as a reliable next-generation magnetic recording device. A present hard disk uses a perpendicular magnetic recording (PMR) method beyond a longitudinal magnetic recording (LMR) method. However, it is difficult to further increase the density of a PMR channel due to a super paramagnetism phenomenon. One of storage devices for overcoming such super paramagnetism phenomenon and increasing a recording density is patterned media. The patterned media is a method that switches a configuration of a recording bit to a single magnetic domain rather than an aggregate of magnetic particles to store the switched result. That is, the patterned media may manufacture the recording bit in a 2D pattern array so that one pattern has one domain. Through this, it is possible to solve a noise problem between particles, significantly increase the recording density, and overcome the super paramagnetism phenomenon. In addition, it is possible to show various advantages even in view of a hard disk system.

The patterned media store a single bit in a small-sized island. However, when the patterned media is implemented in a high density, an interval between the small-sized island and an adjacent island becomes narrower, and therefore inter-track interference (ITI) may occur as well as inter-symbol interference (ISI) existing in an existing storage device. Here, through a 2D signal processing method other than an existing one-dimensional signal processing method, more excellent performance may be obtained. In addition, ITI may adversely affect the performance when a phenomenon (read head offset) in which a position of a track is changed occurs.

SUMMARY OF THE DISCLOSURE

The present disclosure is directed to a method for compensating for inter-symbol interference in a two-dimensional (2D) data structure.

The present disclosure is directed to an apparatus for compensating for inter-symbol interference in a 2D data structure.

According to an aspect of the present disclosure, there is provided a method for compensating for inter-symbol interference (ISI) in a two-dimensional (2D) data structure, including: transmitting, by a transmission terminal, values of a plurality of source pixels based on a source 2D data structure through a channel; receiving, by a reception terminal, values of a plurality of pixels to be compensated based on a 2D data structure to be compensated through the channel; and compensating, by the reception terminal, for each of the values of the plurality of pixels to be compensated to each of values of corresponding pixels after compensating, wherein the values of the plurality of pixels to be compensated are change values of the values of the source pixels due to the ISI, and each of the values of the pixels after compensating is determined based on each of the values of the pixels to be compensated and values of neighboring pixels of each of the pixels to be compensated.

Here, each of the values of the pixels after compensating may be determined based on the following Equation.

$$I'_{(m,n)} = I_{(m,n)} - \Delta(I_{(m-1,n-1)} + I_{(m-1,n)} + I_{(m-1,n+1)} + I_{(m,n-1)} + I_{(m,n+1)} + I_{(m+1,n-1)} + I_{(m+1,n)} + I_{(m+1,n+1)})$$ [Equation]

where $I'_{(m,n)}$ denotes the value of the pixel after compensating of a position (m, n), $I_{(m,n)}$ denotes the value of the pixel to be compensated of the position (m, n), each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ denotes the value of the neighboring pixel, and $\Delta$ denotes a weight value.

Also, $\Delta$ may be changed in accordance with a signal to noise ratio (SNR).

Also, the method for compensating for ISI may further include: performing, by the reception terminal, a misalignment compensation preprocessing process with respect to each of the values of the pixels after compensating.

Also, each of the values of the pixels after compensating may be determined based on the following Equation.

$$I'_{(m,n)} = I_{(m,n)} - \Delta_1 I_{(m-1,n-1)} - \Delta_2 I_{(m-1,n)} - \Delta_3 I_{(m-1,n+1)} - \Delta_4 I_{(m,n-1)} - \Delta_5 I_{(m,n+1)} - \Delta_6 I_{(m+1,n-1)} - \Delta_7 I_{(m+1,n)} - \Delta_8 I_{(m+1,n+1)}$$ [Equation]

where $I'_{(m,n)}$ denotes the value of the pixel after compensating of a position (m, n), $I_{(m,n)}$ denotes the value of the pixel to be compensated of the position (m, n), each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ denotes the value of the neighboring pixel, and $\Delta_1 \sim \Delta_8$ denotes a weight value with respect to each of the neighboring pixels of the pixels to be compensated.

Also, the weight value with respect to each of the neighboring pixels may be determined based on a reference page transmitted to the reception terminal, and values of pixels included in the reference page may be all "1".

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
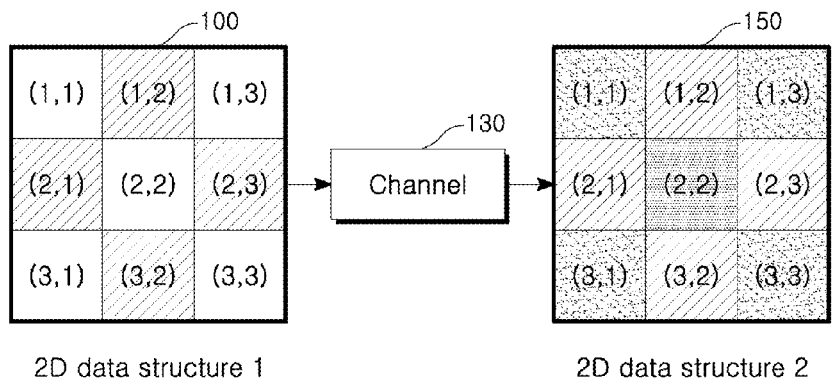
FIG. 1 is a conceptual diagram illustrating a two-dimensional (2D) data structure in which inter-symbol interference (ISI) occurs according to an embodiment of the present disclosure.

Exemplary embodiments of the present disclosure will be described in detail below with reference to the accompanying drawings. While the present disclosure is shown and described in connection with exemplary embodiments thereof, it will be apparent to those skilled in the art that various modifications can be made without departing from the spirit and scope of the disclosure.

Example embodiments of the present disclosure are disclosed herein. However, specific structural and functional details disclosed herein are merely representative for purposes of describing example embodiments of the present disclosure, and example embodiments of the present disclosure may be embodied in many alternative forms and should not be construed as being limited to example embodiments of the present disclosure set forth herein.

Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. Like numbers refer to like elements throughout the description of the figures.

Hereinafter, embodiments of the present disclosure will be described in detail with reference to the accompanying drawings.

A holographic storage device receives much attention as a next-generation storage device using holographic technology. The holographic storage device stores data on three-dimensions rather than on a plane. Thus, the holographic storage device may simultaneously achieve a high storage capacity, a fast transmission rate, and a short access time. In the holographic storage device, multiple pages of data may be multiplexed and stored in units of pages in a single volume.

Specifically, the holographic storage device may convert the data page having information at the time of storage into a signal beam by a spatial light modulator (SLM), and record, in a holographic medium, an interference pattern created in such a manner that the signal beam is allowed to interfere with a reference beam. On the contrary, the holographic storage device extracts information page signals by making the reference beam incident on the holographic medium at the time of reading. In addition, the holographic storage device performs reading/writing with respect to data only in a 2D manner, and therefore a faster processing speed is possible. However, there are many error factors in the holographic storage device, and as the representative examples of the error factors, inter-symbol interference (ISI), inter-page interference (IPI), misalignment, and the like may be given.

When the existing main factor that makes an error is one-dimensional ISI obtained by storing and reading information in units of lines, the major factor that makes an error in the holographic storage device may be a blur phenomenon which occurs between adjacent pixels by reading data in units of pages based on a charge-coupled device (CCD). That is, two-dimensional ISI may occur in the holographic storage device. In an existing case, signal processing has been performed by thinking only front and back data, but in the holographic storage device, the signal processing should be performed by thinking even upper and lower data as well as the front and back data.

When the signal processing should be performed from one dimension to two dimensions, relatively more errors may be made, and it is not easy to control the errors. In addition, the holographic storage device stores pages in the same space, and therefore IPI may occur. There are several multiplexing methods for overlapping and storing a plurality of pages, and various multiplexing methods that can minimize IPI have been proposed. However, there is no method that can completely remove IPI. In addition, in a case in which the holographic storage device reads data, when a position of a CCD array does not exactly align, misalignment may occur. Such misalignment causes bit error rate (BER) performance to be deteriorated. Thus, there are two-dimensional ISI, IPI, misalignment, and the like, and therefore there is a need for an algorithm for reducing the two-dimensional ISI, IPI, misalignment, and the like.

Hereinafter, according to embodiments of the present disclosure, a method for compensating for source data (or source pixel value) affected by neighboring pixels based on a pre-processing process is disclosed.

FIG. 1 is a conceptual diagram illustrating a two-dimensional (2D) data structure in which inter-symbol interference (ISI) occurs according to an embodiment of the present disclosure.

In FIG. 1, ISI that occurs after the 2D data structure passes through a channel is disclosed.

Referring to FIG. 1, a 2D data structure 1 (100) indicates source data in which 0 or 1 is mapped on each of pixels of positions (1, 1) to (3, 3). In the 2D data structure 1 (100), 1 is mapped on each of the pixels of the positions (1, 2), (2, 1), (2, 3), and (3, 2), and 0 is mapped on each of the pixels of the remaining positions. Data mapped on (or corresponding to) the pixel may be referred to as a pixel value. When the pixel value is 1, the corresponding pixel may be referred to as an "on pixel", and when the pixel value is 0, the corresponding pixel may be referred to as an "off pixel".

When such a 2D data structure 1 (100) is transmitted from a transmission terminal to a reception terminal through a channel 130, ISI may occur in the pixel values included in the 2D data structure 1 (100) in accordance with channel deterioration. A 2D data structure 2 (150) may include pixel values after ISI occurs in the pixel values included in the 2D data structure 1 (100).

ISI may be interference between the pixel values of the 2D data structure. ISI may be interference to neighboring pixels caused by pixels (that is, on pixel) whose pixel value is 1.

Specifically, referring to the 2D data structure 2 (150), ISI may be interference due to on pixels positioned in (1, 2), (2, 1), (2, 3), and (3, 2). ISI may occur most frequently in the pixel of the position (2, 2) surrounded by the on pixels. In addition, ISI due to the neighboring on pixels may also occur in pixels of positions (1, 1), (1, 3), (3, 1), and (3, 3) positioned adjacent to the on pixels.

According to an embodiment of the present disclosure, a method for compensating for ISI considering positions of pixels to be compensated in the 2D data structure and positions of on pixels positioned adjacent to the pixels to be compensated will be disclosed.

Hereinafter, a 2D data structure before ISI occurs such as the 2D data structure 1 (100) may be referred to as a source 2D data structure, and a 2D data structure after ISI occurs such as the 2D data structure 2 (150) may be referred to as a 2D data structure to be compensated.

In addition, pixels included in the source 2D data structure may be referred to as source pixels, and a pixel value of the source pixel may be referred to as a source pixel value. In addition, pixels included in the 2D data structure to be compensated may be referred to as pixels to be compensated, and a pixel value of the pixel to be compensated may be referred to as a pixel value to be compensated.

Figure 2:
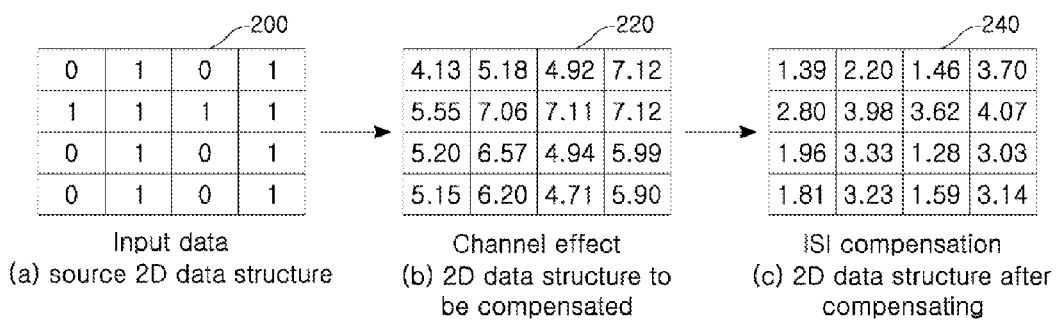
FIG. 2 is a conceptual diagram illustrating a method for compensating for ISI according to an embodiment of the present disclosure.

FIG. 2 is a conceptual diagram illustrating a method for compensating for ISI according to an embodiment of the present disclosure.

In FIG. 2, a method for compensating for ISI which compensates for a pixel to be compensated to be a source pixel value based on neighboring pixel values to be compensated around the pixel to be compensated is disclosed.

The pixel value of the pixel to be compensated included in the 2D data structure to be compensated is a value affected by pixel values of pixels around the pixel to be compensated. Thus, it is possible to compensate for the pixel value of the pixel to be compensated based on the pixel values of the neighboring pixels again.

The 2D data structure to be compensated after compensating may be referred to as a 2D data structure after compensating. In addition, the pixel to be compensated after compensating which is included in the 2D data structure after compensating may be referred to as a pixel after compensating. The pixel value of the pixel after compensating may be referred to as a pixel value after compensating.

In (a) of FIG. 2, a conceptual diagram illustrating a source 2D data structure 200 is shown, in (b) of FIG. 2, a conceptual diagram illustrating a 2D data structure 220 to be compensated is shown, and in (c) of FIG. 2, a conceptual diagram illustrating a 2D data structure 240 after compensating is shown.

That is, when the source 2D data structure 200 passes through a deteriorated channel, a 2D data structure 220 to be compensated may be obtained. After the 2D data structure 220 to be compensated is subjected to ISI compensation according to an embodiment of the present disclosure, a 2D data structure 240 after compensating may be obtained.

Figure 3:
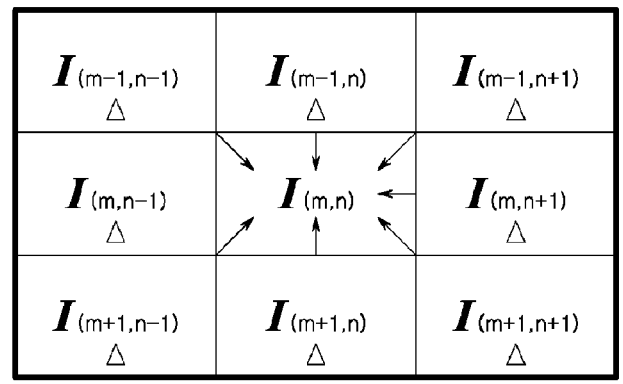
FIG. 3 is a conceptual diagram illustrating a method for compensating for ISI according to an embodiment of the present disclosure.

FIG. 3 is a conceptual diagram illustrating a method for compensating for ISI according to an embodiment of the present disclosure.

In FIG. 3, a signal processing procedure in a preprocessing process (ISI compensation preprocessing process) for performing ISI compensation is disclosed.

The ISI compensation preprocessing process according to an embodiment of the present disclosure may be performed based on the following Equation 1.

$$I'_{(m,n)} = I_{(m,n)} - \Delta(I_{(m-1,n-1)} + I_{(m-1,n)} + I_{(m-1,n+1)} + I_{(m,n-1)} + I_{(m,n+1)} + I_{(m+1,n-1)} + I_{(m-1,n)} + I_{(m+1,n+1)})$$ [Equation 1]

Referring to Equation 1, $I'_{(m,n)}$ may denote the value of the pixel after compensating of a position (m, n), $I_{(m,n)}$ may denote the value of the pixel to be compensated of the position (m, n), and $\Delta$ may denote a weight value. Here, $\Delta$ may be changed in accordance with a signal to noise ratio (SNR) and a magnitude of misalignment. For example, the value of $\Delta$ may be 0.12 that is an average value of optimal $\Delta$ values. In addition, $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ may denote values of the neighboring pixels of the pixel to be compensated.

Equation 1 is obtained by assuming a case in which eight neighboring pixels exist around a single pixel. When eight neighboring pixels or less exist around the single pixel such as in pixels positioned in edges, Equation 1 may be applied by assuming that the pixel value of the neighboring pixel which does not exist is 0.

Equation 1 may be applied to a plurality of pixels to be compensated in the 2D data structure to be compensated. That is, after the ISI compensation preprocessing process is performed with respect to $I_{(m,n)}$, the ISI compensation preprocessing process may be performed with respect to I(m,n+1) using eight neighboring pixel values with respect to $I_{(m,n-1)}$ by moving to $I_{(m,n-1)}$.

For example, a case in which a source pixel value of a pixel of a position (m, n) is 0, and a source pixel value of each of eight neighboring pixels of the pixel of the position (m, n) is 1 may be assumed. Due to the effect of ISI, the source pixel of the position (m, n) may be a pixel to be compensated of the position (m, n) in the reception terminal. The pixel value of the pixel to be compensated of the position (m, n) may be a value larger than 0.

Due to the effect of ISI, the eight neighboring pixels of the pixel of the position (m, n) may be pixels to be compensated in the reception terminal. That is, the eight neighboring pixels of the pixel to be compensated of the position (m, n) may be also the pixels to be compensated due to the effect of ISI, and the pixel value to be compensated may be a value larger than 1.

That is, according to an embodiment of the present disclosure, the eight neighboring pixels of the pixel to be compensated of the position (m, n) may be also the pixels to be compensated which are affected by ISI, and the pixel to be compensated of the position (m, n) may be compensated based on the eight neighboring pixels to be compensated.

In addition, according to an embodiment of the present disclosure, in order to correct additional source pixel values, misalignment compensation may be additionally performed after the ISI compensation, as a preprocessing process. In a case in which the holographic storage device reads data, when the position of a charge coupled device (CCD) array does not exactly align, misalignment may occur. Such misalignment causes bit error rate (BER) performance to be deteriorated. Thus, compensation may be performed by a portion of misalignment using a misalignment preprocessing method.

Figure 4:
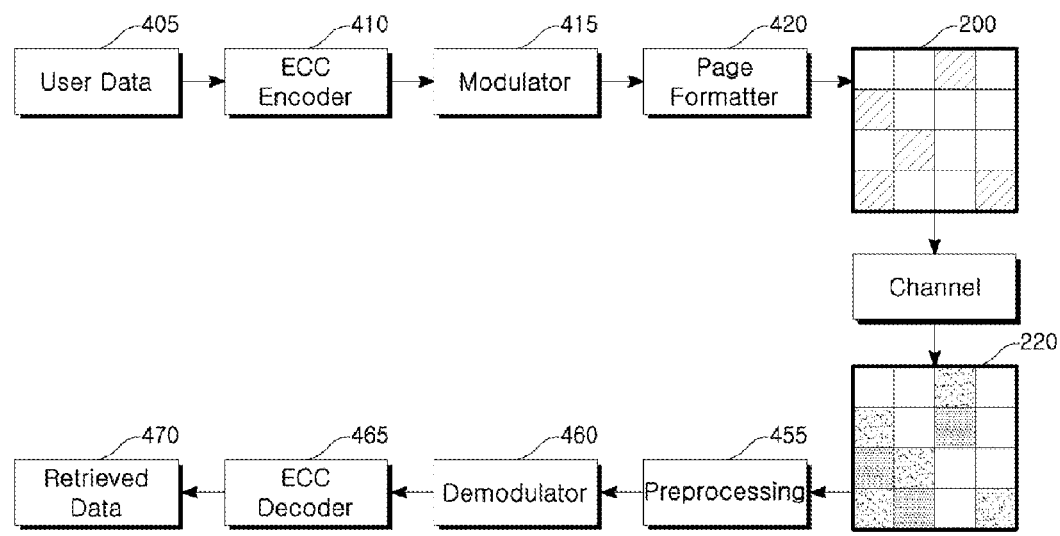
FIG. 4 is a conceptual diagram illustrating a signal processing procedure of an ISI compensation preprocessing process disclosed for a holographic storage device according to an embodiment of the present disclosure.

FIG. 4 is a conceptual diagram illustrating a signal processing procedure of an ISI compensation preprocessing process disclosed for a holographic storage device according to an embodiment of the present disclosure.

Referring to FIG. 4, user data 405 may have the source 2D data structure 200 through an encoding procedure 410, a modulation procedure 415, and a page format procedure 420. The user data 405 may be transmitted to the reception terminal through a channel, as the source 2D data structure 200. After passing through the channel, the source 2D data structure 200 may be changed into the 2D data structure 220 to be compensated in the reception terminal due to ISI.

The 2D data structure 220 to be compensated may be changed into the 2D data structure 240 after compensating based on ISI compensation preprocessing and/or misalignment compensation preprocessing according to an embodiment of the present disclosure in a preprocessing procedure 455.

The 2D data structure 240 after compensating may be transmitted to the reception terminal through a demodulation procedure 460, a decoding procedure 465, as restored data

470. A processor of the reception terminal may control the preprocessing procedure 455, the demodulation procedure 460, and the decoding procedure 465.

Hereinafter, in a case in which preprocessing based on an ISI compensation method and/or a misalignment compensation method according to an embodiment of the present disclosure is performed in the reception terminal, BER is disclosed.

As described above, a holographic channel model may make input data into output data through the CCD array. A consecutive point-spread function (PSF) of a position (x,y) in an input page may be represented as the following Equation 2.

$$h(x, y) = \frac{1}{\sigma_b^2} sinc^2\left(\frac{x}{\sigma_b}, \frac{y}{\sigma_b}\right) \quad \text{[Equation 2]}$$

Here, $\sigma_b$ may denote a degree of blurriness of a distributed signal, and a 2D ISI is increased along with an increase in the value of the degree of blurriness. sin c(x,y) may be defined as the following Equation 3.

$$sinc(x, y) = \left(\frac{\sin(\pi x)}{\pi x}, \frac{\sin(\pi y)}{\pi y}\right) \quad \text{[Equation 3]}$$

Here, a discrete PSF of a position [p,q] may be defined as the following Equation 4.

$$h[p, q] = \int_{q-a/2+m_y}^{q+a/2+m_y} \int_{p-a/2+m_x}^{p+a/2+m_x} h(x, y)\,dx\,dy \quad \text{[Equation 4]}$$

Here, a state in which the CCD array is shifted in position without being in an accurate position is called misalignment, and when displacement of an x-axis is defined as $m_x$ and displacement of a y-axis is defined as $m_y$, a consecutive PSF may be represented as the following Equation 5.

$$h(x, y) = \frac{1}{\sigma_b^2} sinc^2\left(\frac{x+m_x}{\sigma_b}, \frac{y+m_y}{\sigma_b}\right) \quad \text{[Equation 5]}$$

Simulation for performance of the method for compensating for ISI according to an embodiment of the present disclosure was performed with respect to 10 pages, and a size of one page was set as 1024×1024 pixels. The degree of blurriness is 1.85. As a partial response (PR) target used in a channel equalizer, a PR 131 was used. A noise environment given to a channel was obtained by changing an SNR, and the SNR was defined as $10 \log_{10}(1/\sigma_w^2)$. $\sigma_w^2$ is an additive white Gaussian noise (AWGN) power.

An optimal Δ value when BER performance is the highest in accordance with the SNR and the magnitude of the misalignment is represented as the following Table 1.

TABLE 1

| | | | Misalignment | | | | |
|---|---|---|---|---|---|---|---|
| SNR | (0%, 0%) | (5%, 5%) | (10%, 10%) | (15%, 15%) | (20%, 20%) | (25%, 25%) | (30%, 30%) |
| 10 | 0.097 | 0.100 | 0.098 | 0.106 | 0.115 | 0.124 | 0.122 |
| 11 | 0.099 | 0.100 | 0.100 | 0.109 | 0.117 | 0.128 | 0.129 |
| 12 | 0.105 | 0.104 | 0.112 | 0.119 | 0.125 | 0.127 | 0.128 |
| 13 | 0.104 | 0.109 | 0.112 | 0.122 | 0.123 | 0.129 | 0.130 |
| 14 | 0.112 | 0.121 | 0.122 | 0.124 | 0.125 | 0.130 | 0.130 |
| 15 | 0.105 | 0.106 | 0.108 | 0.117 | 0.119 | 0.122 | 0.135 |
| 16 | 0.117 | 0.124 | 0.125 | 0.136 | 0.133 | 0.136 | 0.137 |
| 17 | 0.127 | 0.130 | 0.126 | 0.130 | 0.139 | 0.140 | 0.139 |
| 18 | 0.100 | 0.116 | 0.118 | 0.112 | 0.134 | 0.136 | 0.139 |

In Table 1, an optimal Δ value in accordance with the SNR and misalignment is disclosed.

Figure 5:
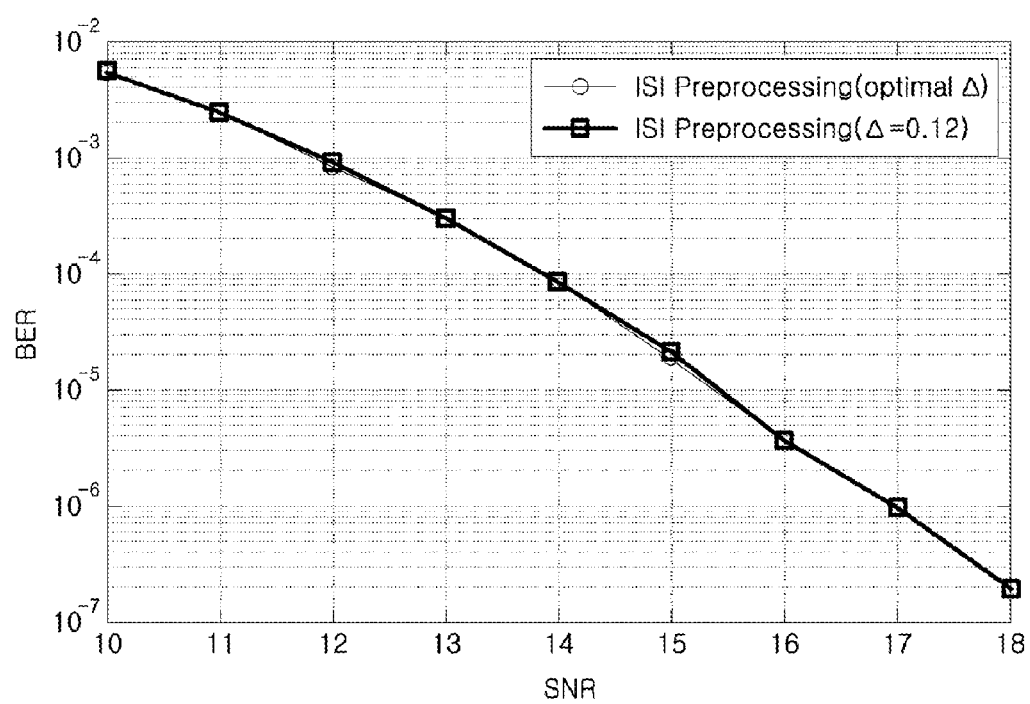
FIG. 5 is a graph illustrating a significant difference between an average value of $\Delta$ and an optimal value of $\Delta$.

FIG. 5 is a graph illustrating a significant difference between an average value of Δ and an optimal value of Δ.

Referring to FIG. 5, there is no significant difference between the average value of the Δ values and the optimal Δ value, and therefore the average value of the Δ values may be used for simulation according to an embodiment of the present disclosure.

Figure 6:
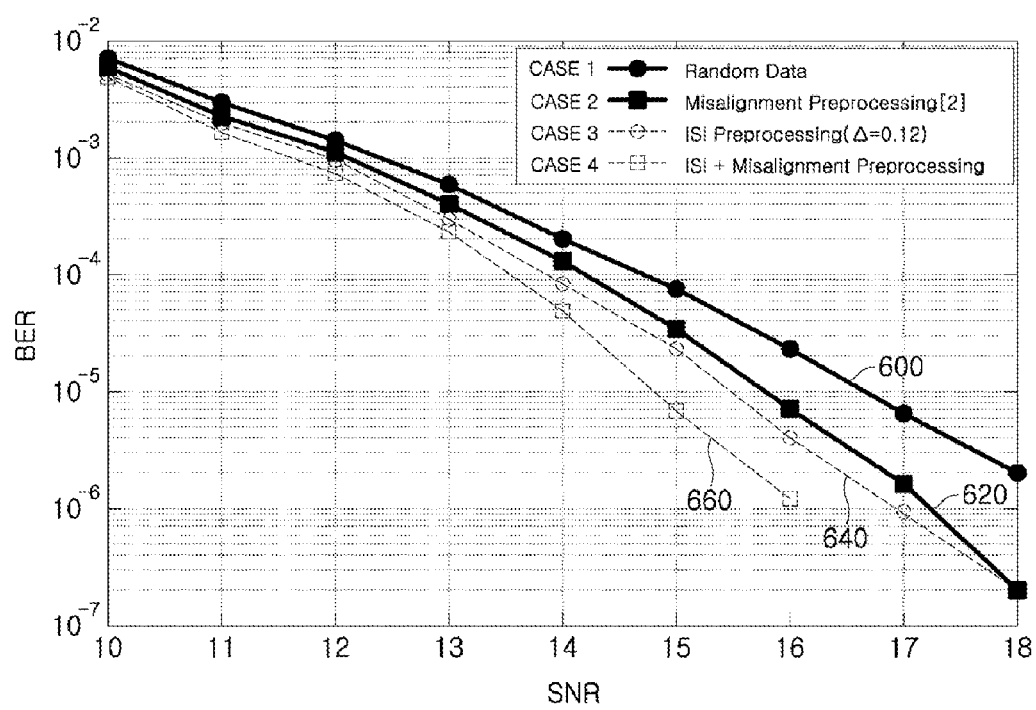
FIG. 6 is a conceptual diagram illustrating bit error rate (BER) performance in accordance with signal-to-noise ratio (SNR)
Figure 7:
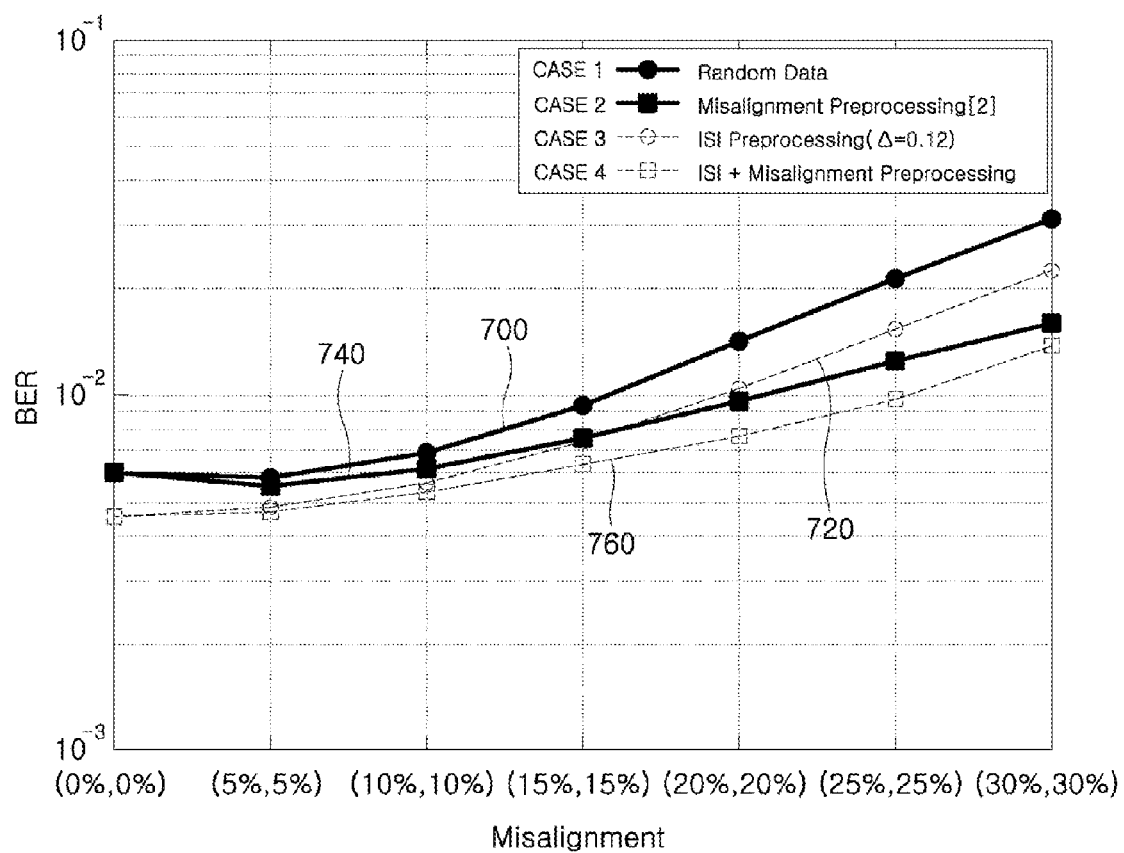
FIG. 7 is a conceptual diagram illustrating BER performance in accordance with misalignment.
Figure 8:
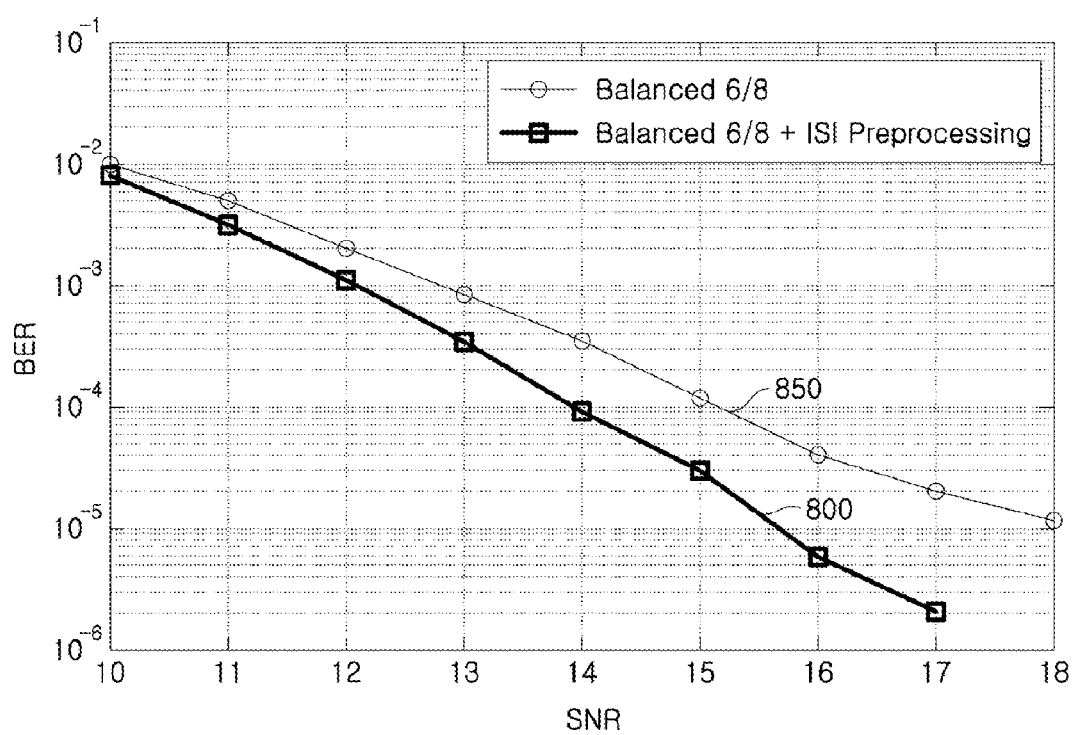
FIG. 8 is a graph illustrating a simulation result when both ISI compensation preprocessing and a modulation code according to an embodiment of the present disclosure are applied.

In FIGS. 6 to 8, simulation results with respect to BER performance which has been performed considering various cases are disclosed.

FIG. 6 is a graph illustrating BER performance in accordance with SNR.

In FIG. 6, a case in which misalignment is (10%, 10%) is shown.

In a case 1 (600), BER performance in accordance with an SNR change with respect to random data on which compensation has not been performed is shown.

In a case 2 (620), BER performance in accordance with an SNR change with respect to data on which a misalignment preprocessing process has been performed is shown.

In a case 3 (640), BER performance in accordance with an SNR change with respect to data on which an ISI compensation preprocessing process according to an embodiment of the present disclosure has been performed is shown.

In a case 4 (660), BER performance in accordance with an SNR change with respect to data on which both the ISI compensation preprocessing process and the misalignment preprocessing process according to an embodiment of the present disclosure have been performed is shown.

Referring to FIG. 6, the case 2 (620) may have a BER value lower than that of the case 1 (600), the case 3 (640) may have a BER value lower than that of the case 2 (620), and the case 4 (660) may have the lowest BER value. That is, it can be seen that a case in which only the ISI compensation preprocessing according to an embodiment of the present disclosure has been performed shows an error rate lower than that of a case in which only the misalignment preprocessing has been performed. In addition, it can be seen that when both the ISI compensation preprocessing and the misalignment preprocessing according to an embodiment of the present disclosure are performed, the lowest error rate is shown.

FIG. 7 is a graph illustrating BER performance in accordance with misalignment.

In FIG. 7, a case in which an SNR is 10 dB is shown.

In a case 1 (700), BER performance in accordance with a change in a magnitude of misalignment with respect to random data on which compensation has not been performed is shown.

In a case 2 (720), BER performance in accordance with a change in a magnitude of misalignment with respect to data on which a misalignment preprocessing process has been performed is shown.

In a case 3 (740), BER performance in accordance with a change in a magnitude of misalignment with respect to data on which an ISI compensation preprocessing process has been performed is shown.

In a case 4 (760), BER performance in accordance with a change in a magnitude of misalignment with respect to data on which both the ISI compensation preprocessing process and the misalignment preprocessing process according to an embodiment of the present disclosure have been performed is shown.

Referring to FIG. 7, the case 2 (720) may have a BER value lower than that of the case 1 (700), the case 3 (740) may have a BER value lower than that of the case 2 (720), and the case 4 (760) may have the lowest BER value. That is, it can be seen that the case in which only the ISI compensation preprocessing according to an embodiment of the present disclosure has been performed shows an error rate lower than that of the case in which only the misalignment preprocessing has been performed. In addition, it can be seen that when both the ISI compensation preprocessing and the misalignment preprocessing according to an embodiment of the present disclosure are performed, the lowest error rate is shown.

The case 1 (700) shows the lowest performance (that is, high BER). When the magnitude of misalignment is smaller than (15%, 15%), the case 3 (740) shows more excellent performance than that of the case 2 (720), and when the magnitude of misalignment is equal to or larger than (15%, 15%), the case 2 (720) shows more excellent performance than that of the case 3 (740). This is because the compensation procedure is performed focusing on the problem concerning the error rate due to misalignment in the case 2 (720), and the compensation procedure is performed focusing on the problem concerning the error rate due to ISI in the case 3 (740).

Even in FIG. 7, it can be seen that, when both the ISI compensation preprocessing and the misalignment preprocessing have been performed, the lowest error rate is shown.

FIG. 8 is a graph illustrating a simulation result when both ISI compensation preprocessing and a modulation code according to an embodiment of the present disclosure are applied.

Referring to FIG. 8, it can be seen that a case 800 in which both 6/8 balanced modulation code and ISI preprocessing have been performed has more excellent performance than that of a case 850 using only the 6/8 balanced modulation code.

Figure 9:
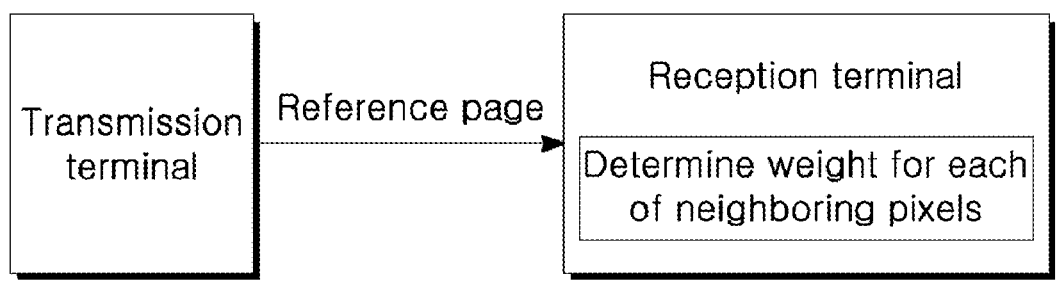
FIG. 9 is a conceptual diagram illustrating a method for compensating for ISI according to an embodiment of the present disclosure.
Figure 9:
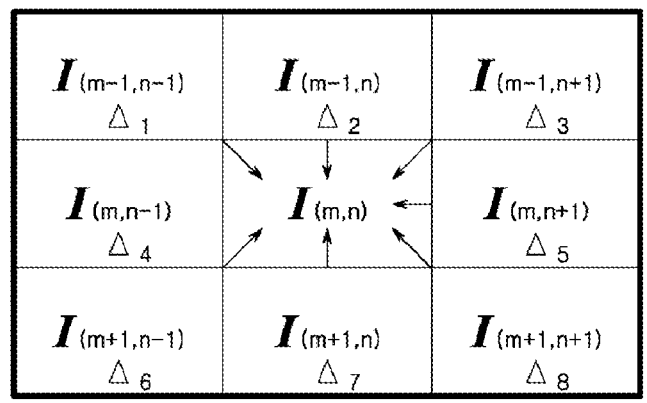

FIG. 9 is a conceptual diagram illustrating a method for compensating for ISI according to an embodiment of the present disclosure.

In FIG. 9, a method for compensating for interference by applying a mutually different weight value to each of neighboring pixels is disclosed.

Referring to FIG. 9, in Equation 1, a case of applying the same weight value to the neighboring pixels to compensate for the pixel to be compensated is disclosed. However, by applying mutually different weight values rather than the same weight value to the neighboring pixels, the pixel to be compensated may be restored to the pixel after compensating.

In order to determine the mutually different weight values, various methods may be used. For example, when the source 2D data structure passes through a deteriorated channel, a source pixel value received in the reception terminal may be a pixel value to be compensated. When the reception terminal knows an accurate source pixel value in advance, individual weight values with respect to the neighboring pixels for the purpose of ISI compensation may be determined.

When information about the individual weight value is obtained, a pixel after compensating may be determined based on the following Equation 6.

$$I'_{(m,n)} = I_{(m,n)} - \Delta_1 I_{(m-1,n-1)} - \Delta_2 I_{(m-1,n)} - \Delta_3 I_{(m-1,n+1)} - \Delta_4 I_{(m,n-1)} - \Delta_5 I_{(m,n+1)} - \Delta_6 I_{(m+1,n-1)} - \Delta_7 I_{(m+1,n)} - \Delta_8 I_{(m+1,n-1)}$$

[Equation 6]

Here, $I'_{(m,n)}$ may denote the value of the pixel after compensating of a position (m, n), and $I_{(m,n)}$ may denote the value of the pixel to be compensated of the position (m, n). In addition, each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ may denote the value of the neighboring pixel, and $\Delta_n$ may denote a weight value with respect to each of the neighboring pixels of the pixel to be compensated. In addition, $\Delta_1 \sim \Delta_8$ may be individual weight values with respect to the neighboring pixels, and the value of $\Delta$ may be changed in accordance with a status of a channel. The value of $\Delta$ may be determined based on the following method. For example, the transmission terminal may transmit a reference page for determining individual weight values with respect to the neighboring pixels for the purpose of ISI compensation. All the pixels included in the reference page may be on pixels. That is, the pixel value of each of the pixels included in the reference page may be 1. The reception terminal may know that the pixel values of the page transmitted as the reference page are all 1.

In this case, the reference page affected by ISI in the reception terminal may indicate a change in the pixel value due to interference. The reception terminal may determine the individual weight values with respect to the neighboring pixels for the purpose of ISI compensation considering the effect of ISI. That is, conversely, an amount of interference of each pixel to other pixels may be calculated based on the change in the pixel value of the reference page affected by ISI, and a weight value for each pixel position may be individually calculated.

The reference page for determining the individual weight values with respect to the neighboring pixels for the purpose of ISI compensation may be periodically transmitted from the transmission terminal to the reception terminal, and compensation for ISI may be performed based on the individual weight values with respect to the neighboring pixels for the purpose of ISI compensation which are calculated based on the periodically transmitted reference page.

According to another embodiment of the present disclosure, compensation for interference may be performed by applying mutually different weight values to each of the neighboring pixel groups of the pixels to be compensated.

For example, the mutually different weight values may be applied to each of the neighboring pixel groups as shown in the following Equation 7.

$$I'_{(m,n)} = I_{(m,n)} - \alpha(I_{(m,n-1)} + I_{(m,n+1)}) - \beta(I_{(m-1,n)} + I_{(m+1,n)}) - \gamma(I_{(m-1,n-1)} + I_{(m-1,n+1)} + I_{(m+1,n-1)} + I_{(m+1,n+1)})$$

[Equation 7]

Here, $I'_{(m,n)}$ may denote the value of the pixel after compensating of a position (m, n), and $I_{(m,n)}$ may denote the value of the pixel to be compensated of the position (m, n). Each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ may be the value of the neighboring pixel.

Here, α, β, and γ are weight values applied to the neighboring pixel group for the purpose of compensation of the pixel to be compensated. Hereinafter, each of α, β, and γ may be referred to as a weight value for each of the neighboring pixel groups. The weight value for each of the neighboring pixel groups may be determined based on the status of the channel. For example, α=0.0651, β=0.1402, and γ=0.0183, or α=0.0432, β=0.1402, and γ=0.0121. The weight value for each of the neighboring pixel groups may be determined in accordance with whether a soft underlayer (SUL) is used in a patterned media storage device.

According to still another embodiment of the present disclosure, only a part of the neighboring pixels may be used for compensation of the pixel to be compensated. The following Equation 8 shows a case in which only a part of the neighboring pixels is used for compensation of the pixel to be compensated.

$$I'_{(m,n)}=I_{(m,n)}-\alpha(I_{(m,n-1)}+I_{(m,n-1)})-\beta(I_{(m-1,n)}+I_{(m-1,n)}) \quad \text{[Equation 8]}$$

Referring to Equation 8, only some pixels of the neighboring pixels of the pixel to be compensated may be used for compensation of the pixel to be compensated.

As described above, according to an embodiment of the present disclosure, a method for removing interference that occurs caused by the 2D data structure passing through a channel is disclosed. By removing interference to the pixel value to be compensated due to the neighboring pixel values, the reception terminal may accurately restore the pixel value included in the 2D data structure transmitted from the transmission terminal.

The methods for compensating for ISI in a 2D data structure according to various embodiments of the present disclosure may be implemented in the form of program instructions that may be implemented with applications or performed through various computer means, and recorded in a computer-readable recording medium. The computer-readable recording medium may separately include program commands, local data files, local data structures, etc. or include a combination of them. The medium may be specially designed and configured for the present disclosure, or known and available to those of ordinary skill in the field of computer software. Examples of the computer-readable recording medium include magnetic media, such as a hard disk, a floppy disk, and a magnetic tape, optical media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. Such a hardware device may be configured to operate in one or more software modules, or vice versa in order to perform the operation of the present disclosure.

It will be apparent to those skilled in the art that various modifications can be made to the above-described exemplary embodiments of the present disclosure without departing from the spirit or scope of the disclosure. Thus, it is intended that the present disclosure covers all such modifications provided they come within the scope of the appended claims and their equivalents.

What is claimed is:

1. A reception terminal for compensating inter-symbol interference (ISI) in a two-dimensional (2D) data structure, the reception terminal comprising:
   a processor,
   wherein the processor receives a plurality of pixel values for compensation based on a 2D data structure for compensation via a channel and compensates each of the plurality of pixel values for compensation to each of pixel values after compensation, respectively,
   wherein the plurality of pixel values for compensation are a distorted set of values of a plurality of source pixel values due to the ISI, and
   wherein each of the pixel values after compensation is determined based on each of the plurality of pixel values for compensation and adjacent pixel values thereof, wherein each of the pixel values after compensation is determined according to a following equation 1

$$I'_{(m,n)}=I_{(m,n)}-\Delta(I_{(m-1,n-1)}+I_{(m-1,n)}+I_{(m-1,n+1)}+I_{(m,n-1)}+ \\ I_{(m,n+1)}+I_{(m+1,n-1)}+I_{(m-1,n)}+I_{(m+1,n+1)}) \quad \text{[Equation 1]}$$

where $I'_{(m,n)}$ denotes the pixel values after compensation at a position (m, n),
   $I_{(m,n)}$ denotes one of the plurality of pixel values for compensation at a position (m, n),
   each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ denotes each of the adjacent pixel values, and $\Delta$ denotes a weight value.

2. The reception terminal of claim 1, wherein a value of $\Delta$ is changed in accordance with an SNR.

3. The reception terminal of claim 2, wherein the processor is implemented to perform a preprocessing process of a misalignment compensation with respect to each of the pixel values after compensation.

4. The reception terminal of claim 1, wherein each of the pixel values after compensation is determined according to a following equation 2, $$I'_{(m,n)}=I_{(m,n)}-\Delta_1 I_{(m-1,n-1)}-\Delta_2 I_{(m-1,n)}-\Delta_3 I_{(m-1,n+1)}- \\ \Delta_4 I_{(m,n-1)}-\Delta_5 I_{(m,n+1)}-\Delta_6 I_{(m+1,n-1)}-\Delta_7 I_{(m+1,n)}- \\ \Delta_8 I_{(m+1,n+1)} \quad \text{[Equation 2]}$$

where $I'_{(m,n)}$ denotes the pixel values after compensation at a position (m, n),
   $I_{(m,n)}$ denotes one of the plurality of pixel values for compensation at a position (m, n),
   each of $I_{(m-1,n-1)}$, $I_{(m-1,n)}$, $I_{(m-1,n+1)}$, $I_{(m,n-1)}$, $I_{(m,n+1)}$, $I_{(m+1,n-1)}$, $I_{(m+1,n)}$, $I_{(m+1,n+1)}$ denotes each of the adjacent pixel values, and each of $\Delta_1 \sim \Delta_8$ denotes a weight value with respect to each of the corresponding adjacent pixel values,
   wherein the weight value with respect to each of the corresponding adjacent pixel values is determined based on a reference page transmitted to the reception terminal, and each and all of pixel values in the reference page are a value of one (1).

* * * * *